(12) United States Patent
Nelson et al.

(10) Patent No.: US 8,408,733 B2
(45) Date of Patent: Apr. 2, 2013

(54) ILLUMINATING BOOK LIGHT

(75) Inventors: David Nelson, Las Vegas, NV (US);
Wai-ming Law, Yuen Long (HK)

(73) Assignee: Sol-Light, LLC, Las Vegas, NV (US)

( * ) Notice: Subject to any disclaimer, the term of this patent is extended or adjusted under 35 U.S.C. 154(b) by 426 days.

(21) Appl. No.: 12/768,995

(22) Filed: Apr. 28, 2010

(65) Prior Publication Data

US 2011/0267807 A1    Nov. 3, 2011

(51) Int. Cl.
*F21L 4/04*      (2006.01)
*F21V 21/26*     (2006.01)
*F21V 21/30*     (2006.01)

(52) U.S. Cl. ........ 362/197; 362/191; 362/270; 362/287; 362/396; 362/419; 362/427

(58) Field of Classification Search ............... 362/98, 362/99, 190, 191, 197, 199, 253, 270, 282, 362/285, 287, 319, 396, 418, 419, 427; D26/44, D26/61–66
See application file for complete search history.

(56) References Cited

U.S. PATENT DOCUMENTS

| | | | |
|---|---|---|---|
| 1,949,289 A | 2/1934 | Andersen | |
| 2,524,881 A | 10/1950 | Chambers | |
| 2,644,383 A | 7/1953 | Meditz | |
| 3,683,844 A * | 8/1972 | Wilkin | 116/240 |
| 4,214,688 A | 7/1980 | Griffin, Jr. | |
| 4,581,684 A * | 4/1986 | Mazzucco | 362/98 |
| D314,836 S | 2/1991 | Sonneman | |
| D321,405 S | 11/1991 | Shwisha | |
| 5,103,384 A | 4/1992 | Drohan | |
| 5,176,443 A * | 1/1993 | Lin | 362/413 |
| D334,438 S | 3/1993 | Kua | |
| 5,265,000 A * | 11/1993 | Lin | 362/413 |
| D353,905 S | 12/1994 | Lin | |
| D354,677 S | 1/1995 | Troyer | |
| 5,695,271 A * | 12/1997 | Zeller | 362/98 |
| D390,989 S | 2/1998 | Zeller | |
| D397,468 S * | 8/1998 | Zeller | D26/60 |
| D397,478 S * | 8/1998 | Booty, Jr. | D26/65 |
| D405,905 S | 2/1999 | Lin | |
| D411,323 S | 6/1999 | Benghozi | |
| 6,113,250 A | 9/2000 | Lin | |
| 6,206,543 B1 | 3/2001 | Henry | |
| 6,361,184 B1 * | 3/2002 | Hallgrimsson et al. | 362/188 |
| D456,546 S | 4/2002 | Bernard | |
| 6,419,370 B1 | 7/2002 | Chen | |
| 6,604,837 B2 | 8/2003 | Sandberg | |
| 7,017,871 B2 | 3/2006 | Chen | |
| D520,663 S | 5/2006 | Ancona et al. | |
| D526,734 S | 8/2006 | Brown | |
| 7,168,821 B2 | 1/2007 | Huang | |
| D585,578 S | 1/2009 | Levine | |
| D599,494 S * | 9/2009 | Levine | D26/61 |
| D618,385 S | 6/2010 | Nelson et al. | |

(Continued)

*Primary Examiner* — Nimeshkumar Patel
*Assistant Examiner* — Steven Horikoshi
(74) *Attorney, Agent, or Firm* — Banner & Witcoff, Ltd.

(57) ABSTRACT

An illuminating device may be used, for example, as a portable illuminator, book light and travel light. The illuminating device may include a head, a pair of rails and a base. The illuminating device may be manipulated into numerous positions including extended and retracted positions such that the light source may be positioned in a variety of positions relative to the base which may include a clip for securing structure the illuminating device to a variety of structures including books, magazines, tables, e-readers and bags, to name a few.

21 Claims, 13 Drawing Sheets

U.S. PATENT DOCUMENTS

| | | |
|---|---|---|
| D618,386 S | 6/2010 | Nelson et al. |
| 2003/0179572 A1* | 9/2003 | Schnell .................. 362/191 |
| 2004/0114373 A1* | 6/2004 | Lin ............................ 362/352 |
| 2005/0018421 A1 | 1/2005 | Parsons |

* cited by examiner

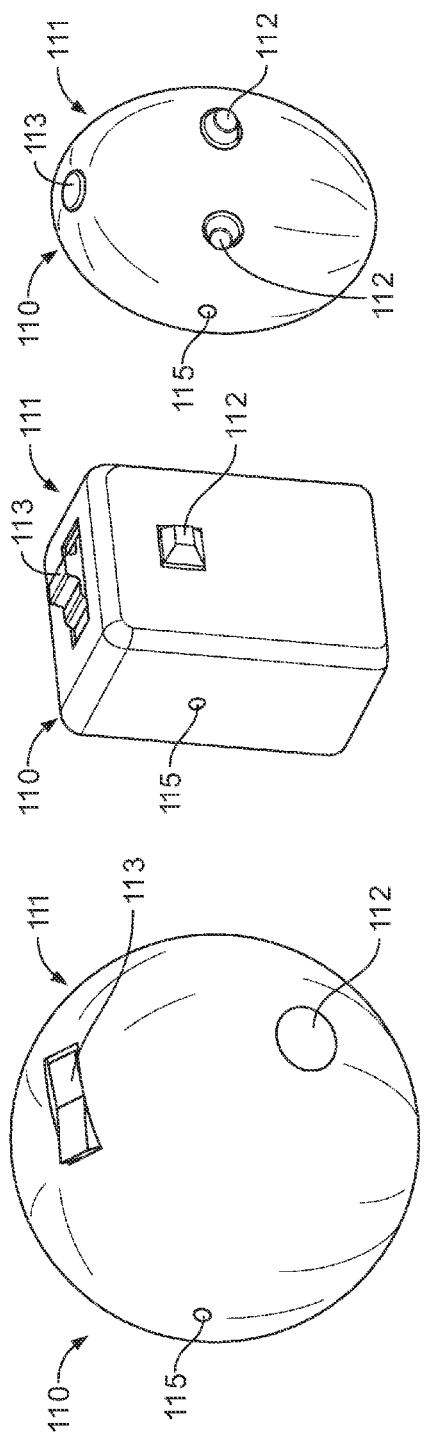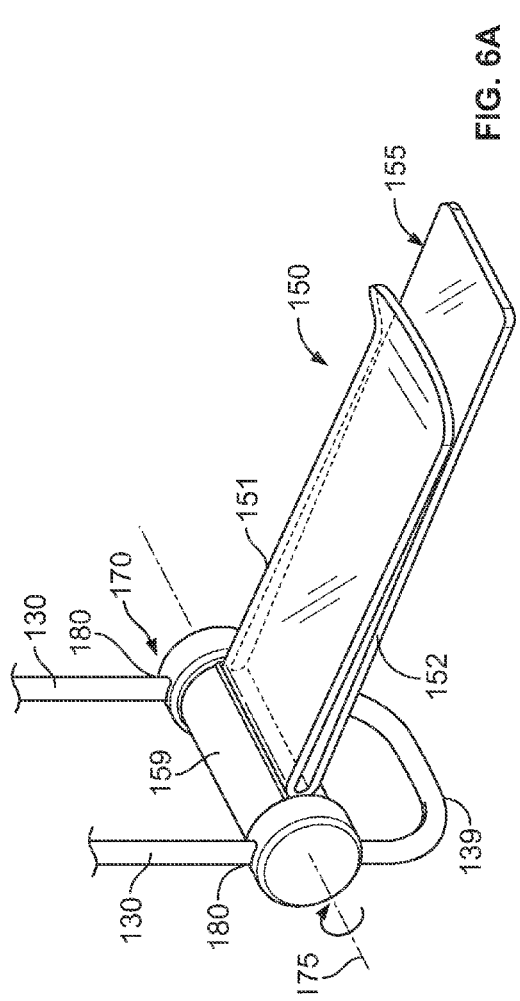

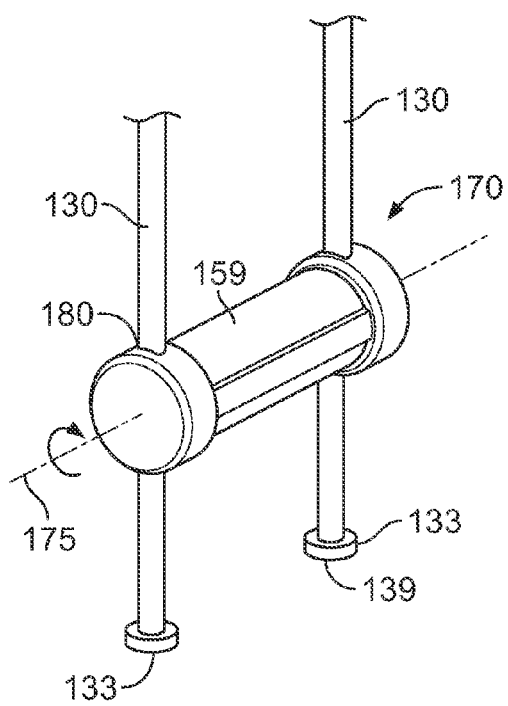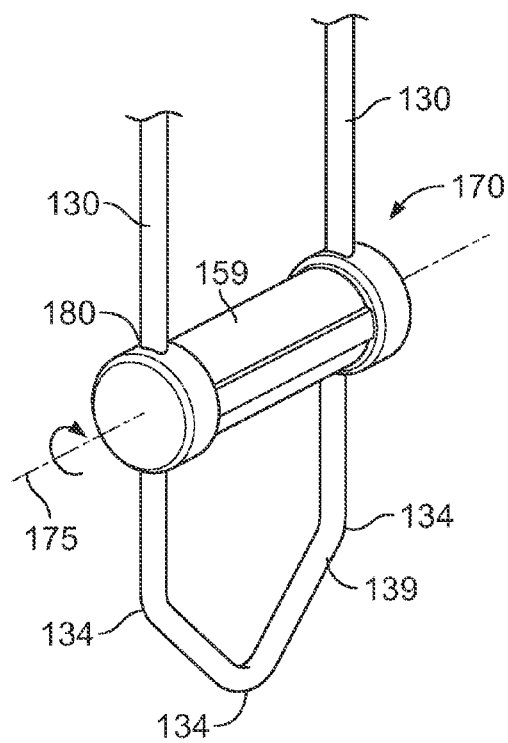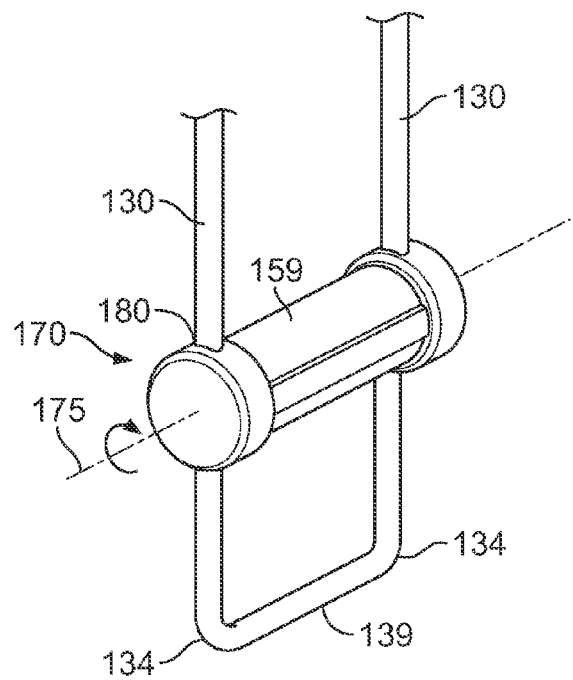

ILLUMINATING BOOK LIGHT

FIELD OF THE INVENTION

The present invention is generally directed to portable illuminating devices. More particularly, aspects of the invention pertain to low light illuminators including book lights.

BACKGROUND OF THE INVENTION

Portable illuminators are commonly known and useful in providing lighting to specific areas on a temporal basis. Certain portable illuminators can be affixed to objects thereby eliminating the need for the user to hold the light in order to use the light emitted. An example of portable illuminator may be a book light. Book lights often have a clip for clipping on a book and a light extending from the clip. The light may typically be positioned when manipulated by a user. Portable illuminators such as book lights are normally used in low light environments.

Many portable illuminators are limited regarding their positions of illumination. Portable illuminators often have a specific mode of illumination or several related optional positions of illumination. The invariability of certain lighting characteristics of conventional portable illuminators potentially presents drawbacks when the light is used under certain conditions. Additionally, portable illuminators may lack desired attachment features or physical characteristics.

SUMMARY OF THE INVENTION

An aspect of the present invention includes a portable illuminator with improved movement and orientation characteristics and features. Further, aspects also relate to providing a portable illuminator with a wider range of modifiable operable lighting characteristics related to its positioning features.

A first aspect of the invention provides for an illuminating device with a head that includes a housing and a light source contained within the housing, a base that includes a clip that is configured to permit removable attachment to an article, and a pair of rails that couples the head and the base so that the head is both translationally fixed and pivotably attached to the pair of rails. The base is also linearly translatable relative to the head along the pair of rails. In various configurations the head is pivotable 360 degrees about an axis of rotation. The head may be pivotable in a single direction or in both directions. The pair of rails housing the head may be coupled to the base by a rails-clip coupling mechanism such that the rails-clip coupling mechanism internally and slidably houses the pair of rails. A portion of the base may wrap around a coupling member so as to permit the base to pivot about a first axis while the head may pivot about a second distinct axis. The clip may be transparent allowing a user to view and read indicia on an opposing side of the clip.

Another aspect of the invention provides for an illuminating device with a head that includes a housing and a light source contained within the housing, a base that includes a clip that is configured to permit removable attachment to an article, and a pair of rails coupling the head and the base. The head is translationally fixed at a first end of the pair of rails with the pair of rails configured so that the head is spaced from the base when the pair of rails are in an extended position and adjacent to the base when the pair of rails in a retracted position. The head may be spaced in a plurality of positions between the extended and retracted position. A rails-clip coupling mechanism may also be utilized to moveably couple the head and the base and the pair of rails may be housed within and frictionally engage the channels within the rails-clip coupling mechanism.

In yet another aspect of the invention, an illuminating device include a head with a housing and a light source contained within the housing, a base that includes a clip that is configured to permit removable attachment to an article, and a pair of rails coupling the head and the base. The head is translationally fixed to the pair of rails and the pair of rails are configured to allow the base to be completely housed in a region between the pair of rails when the device is in a closed position. The head may be used or operated and may also be pivoted while the illuminating device is in the closed position.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5A-5C are illustrative schematics of alternate arrangements of heads of the illuminating device of FIGS. 1A-4B.

FIGS. 6A-6C are illustrative schematics of alternate arrangements of the clip of the illuminating device of FIGS. 1A-4B.

FIGS. 7A-7C are illustrative schematics of alternate arrangements of the pair of rails of the illuminating device of FIGS. 1A-4B.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1A:
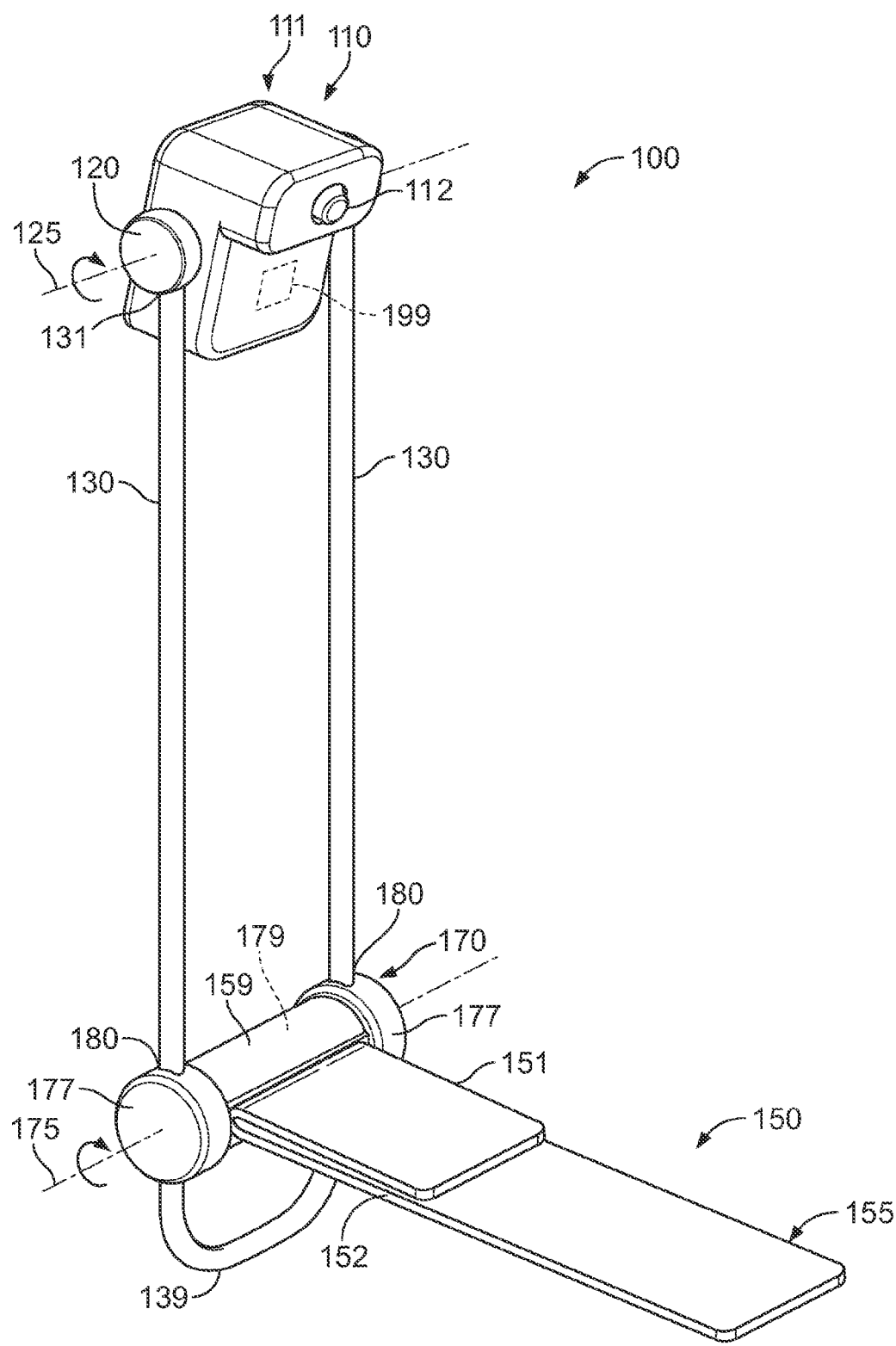
FIGS. 1A, 1B, and 1C are perspective, front and rear views respectively of an exemplary illuminating device in a first position.
Figure 1B:
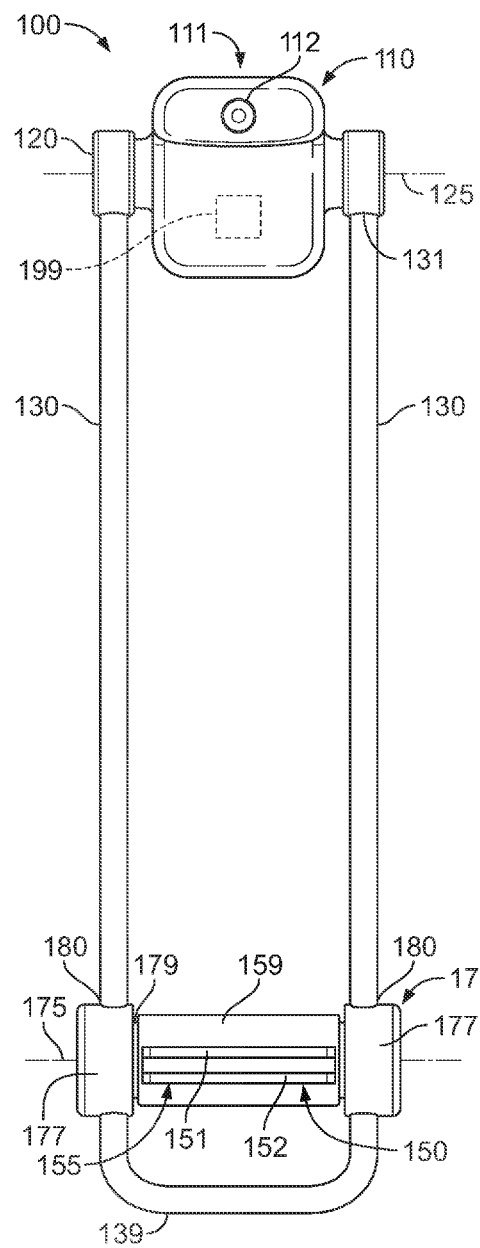
Figure 1C:
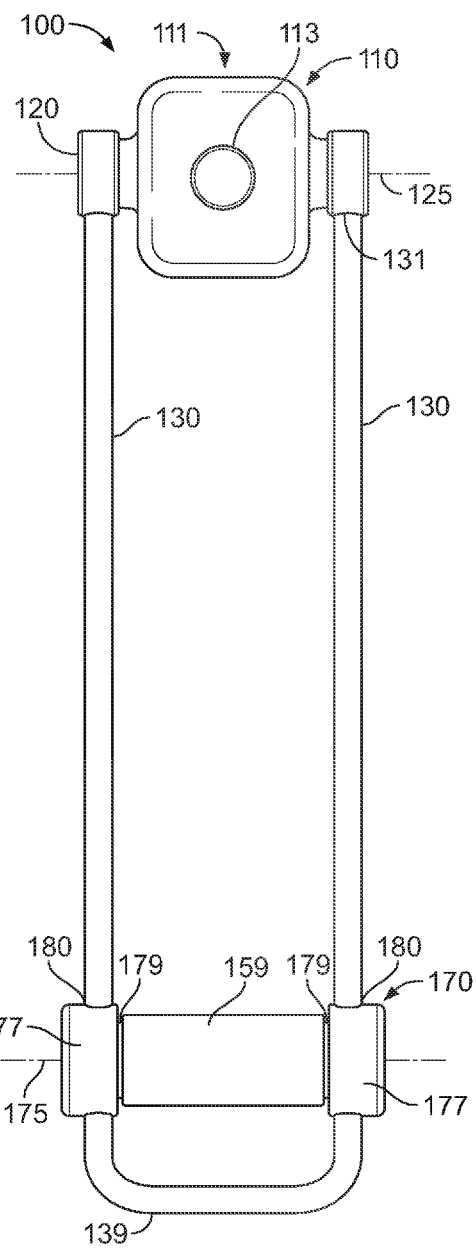

FIGS. 1A, 1B, and 1C are perspective, front and rear views respectively of an embodiment of an illuminating device 100. Depicted illuminating device 100 generally includes a head 110, a pair of rails 130, and a base 150. In various configurations the base 150 is comprised of a clip 155. The head 110, pair of rails 130 and clip 155 are coupled and configured to enable desired user manipulation and positioning of the head 110 and clip 155 relative to each other to provide illumination characteristics desired by a user. Here, a rails-clip coupling mechanism 170 couples the pair of rails 130 to the clip 155, as will be described in further detail later. The head 110 includes a housing 111 that has a light source 112. Further, as described hereinafter, the head is pivotably coupled to the pair of rails 130 which enables the head 110 to be angularly placed in a number of different positions relative to the pair of rails 130 and further enables the user to place the light source 112 in varied relative orientations. Further, as can be seen by FIGS. 5A-5C, the size, shape, profile etc., of the head, can be varied based on preference, for example to emit light in various preferred positions and directions.

A light source 112 is located on housing 111 in the exemplary arrangement. In one arrangement, the light source takes the form of at least one illuminating member such as an LED (light-emitting diode) or other known light producers. When the light source 112 is "ON", light emanating from the light source 112 will shine in the area generally surrounding the light source 112. Movement of the head 110, including rotation of the head, permits a user to vary the location and direction the light from the light source 112 can be shined. Additionally, varied light source shape, configuration and size may be modified to provide preferred light characteristics as is known in the art.

In the exemplary arrangement, the light source is part of a lighting system that may also include electronic components used to emit the light including power sources such as one or more batteries, connecting circuitry conventionally used in light sources, especially portable light sources, and a controllable switching device. For example, FIGS. 1A-1B illustratively depict a schematic of a battery 199 housed internally within the head 110. (As is describe in more detail later, a power source such as a battery may be housed elsewhere on the illuminating device as well.) These components may all be contained on or in the housing 111 of the head 110 or in various other locations on the lighting device. In one arrangement, the housing 111 may include a power source, electrical components and other structural components that affix or secure the aforementioned electrical components as well as other components within light source housing 111.

Figure 4A:
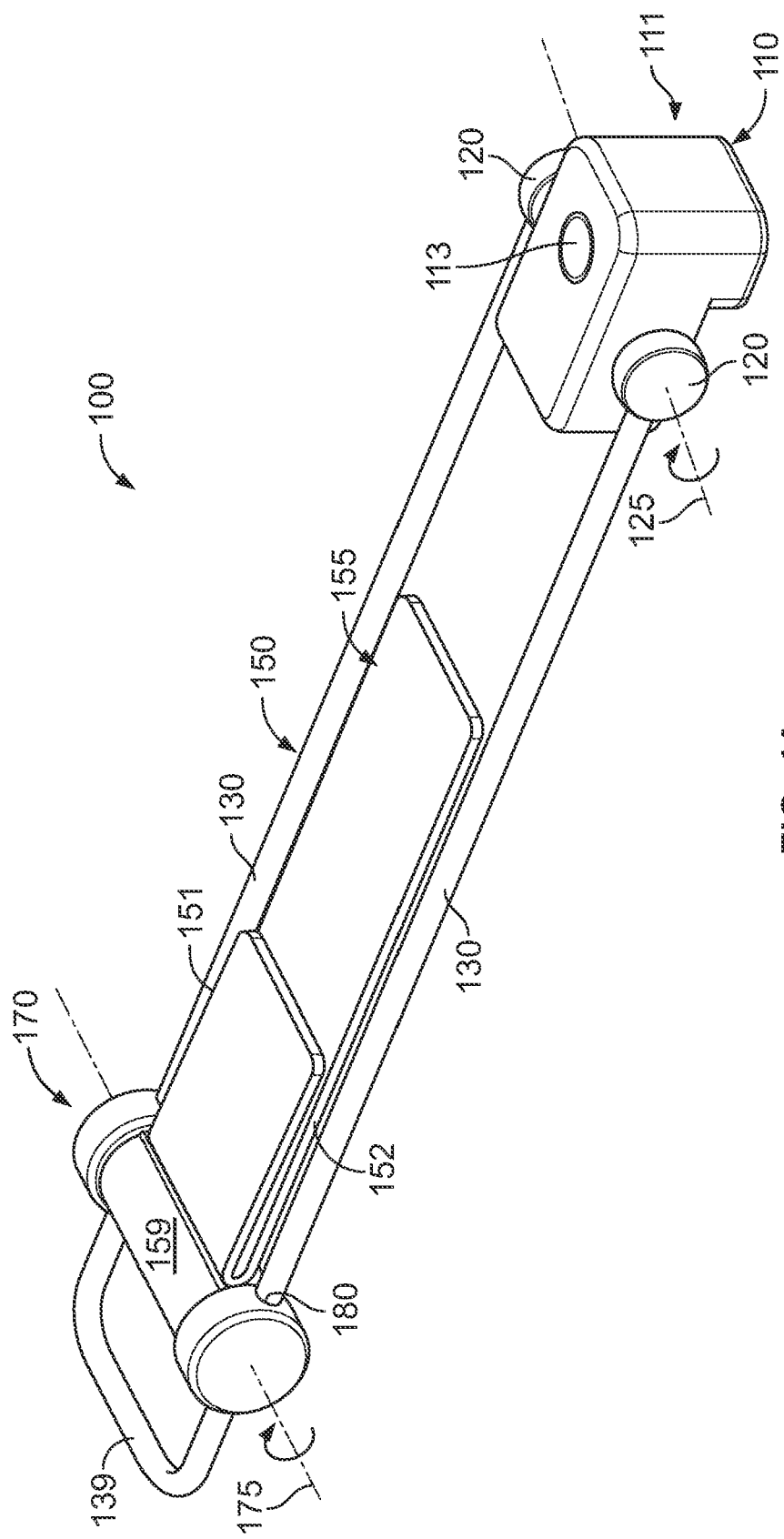
FIGS. 4A and 4B are perspective views respectively depicting varied positions of the illuminating device of FIGS. 1A-3B.

A controllable switching device in the form of a user engageable control mechanism 113 is included on the housing 111 in the depicted embodiments. In exemplary arrangements and as shown in FIGS. 1C, 4A and 5D, the user engageable control mechanism 113 is a depressible button type switch located on the top of light source housing 111. A user may depress the depicted button to control the light source between at least "ON" and "OFF" states as desired. Such button control switches are known in the switching art and may include a suitable biasing device and circuitry to accomplish switching. In the illustrative embodiments of 1C, 4A and 5D, the depressible button 113 is raised from the surrounding region on the housing 111. Further arrangements of user engageable control mechanisms are described below in relation to various figures. However, any desired switch may be used.

In the depicted embodiment, head 110 may be described as being translationally fixed to the pair of rails 130 as the head does not translationally move relative to the pair of rails 130. Any conventional means of attachment well known in the art may serve as an adequate attaching mechanism. For example, the mechanisms may include gluing, screwing, melting, bonding, pinching, hinging or squeezing so as to affix light source housing 111 to the pivots 120 so as to permit the translationally fixed but pivotable configurations as shown and described. As shown, if the pair of rails 130 is moved up, the head will be moved in coordinated fashion the same distance upward and the same occurs if the pair of rails is moved downward or if the pair of rails are rotated about an axis 175 as will be discussed in further detail later.

The head 110 may be pivotably moved by rotating the head 110 about an axis 125. In this arrangement axis 125 runs through a cross-section of the head and may be described as being perpendicular to the pair of rails as the axis 125 runs perpendicular to the major dimension (e.g, here in FIGS. 1A-1C the height of the rails). So as to allow pivotable movement while translationally fixing the head 110 to the end of the pair of rails 130, the head 110 is coupled to the end of the pair of rails 130 via pivots 120. The pivots 120 are housed on the end of the pair of rails and attach to opposing sides of the head 110 such that the head is sandwiched between the pivots 120. The head end 131 of the dual rails is attached to the bottom portion of the pivots 120 and secures the pivots 120 in place. The opposing end of the pair of rails (dual rails), the base end 139 of the dual rails, is shaped as a "U" in the arrangement of FIGS. 1A-1C. As demonstrated and described in further detail below, the based end 139 of the pair of rails 130 may be any of a number of shapes, sizes or orientations so as to still continually movably couple the base 150 and the head 110.

In the context of this application, description of the head being translationally fixed is not limited to only a purely fixed position but further includes a posture in which the head can be set to any of several predetermined positions. Thus, if the head 110 was coupled to the pair of rails 130 in a manner such that a series of pre-determined connection postures such as "three head—rails connection positions", the head 110 would be considered as being "translationally fixed" to the pair of rails as the terms are being used herewith.

Additionally, it is recognized that in certain configurations components such as the head 110 or clip 155 may be removed and also re-attached. In this manner, replacement components may also be utilized and components may also be varied in certain configurations according to user preference. For example, FIGS. 5A-5C and FIGS. 6A-6C illustratively depict various configurations of heads 110 and clips 155 respectively and will be discussed in more detail below. The illuminating device 100 can be configured in certain arrangements such that varied head 110 and clip 155 components may be utilized on a given illuminating device 100. Certain embodiments may also be configured such that removal of the head 110, clip 155, or various other components is not possible without generally destroying the illuminating device 100 if this is desirable for safety, ease of manufacturing, cost or user/manufacturer preference.

The clip 155 is formed so that it is capable of attaching, grasping or securing itself to a number of structures which illustratively include books, e-readers and other similar electronic reading devices, magazines, tables, laptop computers, automobile visors, automobile dashboards, railings as well as any other object or structure to which an illuminating device may be affixed. By way of illustrative example, the clip 155 may attach on covers or pages of a book or on a cover or jacket of an e-reader. The clip 155 may be configured to adhere to numerous surfaces and objects as shown, described and contemplated herein. In certain depicted arrangements, the base includes a clip 155 formed by two members, a top 151 and a bottom 152. In FIGS. 1A-1C, the top 151 is depicted as being shorter than the bottom 152. However, in varied configurations the top 151 and the bottom 152 may be of equivalent length or the bottom 152 may be shorter. Also the clip 155 may take on varied shapes and configurations. The clip may be formed by a pair of flattened rectangular members of varied length as shown in FIGS. 1A-1C or it may be formed by curved members and various other permutations. The clip 155 may also include features to assist it in holding on structure. For example, in may instances the top 151 and bottom 152 are biased including use of preformed plastic or other materials such that placement of a structure between these members result in a squeezing force being placed on the structure and facilitates the base 150 being temporarily affixed to the structure until the base is released from the article. Additionally, the base may include features that result in preferred characteristics including gripping surface features placed on inner surfaces of the clip 155 to increase the friction and grip on articles in which the clip 155 is attached as is known in the art. Also the clip 155 may be configured such that pressure to the outer surface of the respective top 151 and bottom 152 cause the clip 155 to release its hold on the article upon which the clip 155 is temporarily coupled, attached, or secured.

Among the uses of the described illuminating device 100 is use as a book-light. In certain configurations, the clip 155 is configured so as to have preferred gripping characteristics so that pages of books, magazine, and other read materials are not damaged when the light is attached to the books etc. Additionally, the book light may also be configured for use with various electronic readers such that the gripping surface of the clip 155 and the force applied on the structure to which the clip 155 grabs a hold does not damage a user's or reader's device, device cover or the like.

In certain configurations, the rails-clip coupling mechanism 170 may also include a portion wrapped about coupling member 179 (not visible but housed within sleeve 159 and between pivots 177) thereby rotatably coupling the base to the head. In one configuration, sleeve 159 can be formed as a portion of the base 150 and sized and shaped to wrap about an outer surface of the coupling member 179. As such, sleeve 159 slides about the outer surface of the coupling member 179 and permits the base 150 including the clip 155 to be rotated relative to the coupling member 179 and the pair of rails 130 when a user manipulates or pushes on the clip 155 holding the pair of rails 130 stationary. In this configuration, the base 150 is pivotable about an axis 175 perpendicular to the pair of rails 130. Thus, as shown, each of the head 110 and the clip 155 are independently pivotable about a different axis of rotation but the two axis of rotation are parallel. This configuration permits a wide array of varied positions of the head and base relative to one another. Additionally, coupling member 179 may also be composed of two or more physical members or structures. One example contemplated includes a plurality of disc structures between the pair of rails 130 and engaged with pivots 177. For example, pivots 177 may have a protrusion or recess in complimentary engagement with the rails-clip coupling mechanism 170 which may be formed of a plurality of physical structures as is well known in the art so as to accomplish the described rotational movement.

The pair of rails further permits varied and complex movement of the illuminating device 100 so as to permit the device to be oriented in a variety of user preferred positions. The pair of rails 130 may be described as being slidably housed within the rails-clip coupling mechanism. Accordingly, the pair of rails may be slid through a pair of spaced channels 180 extending through the rails-clip coupling mechanism 170. The channels 180 are sized to snugly fit and frictionally engage the outer surface of the pair of rails 130. As such, the channels 180 and the dual rails 130 may be described as complementary in size. However, application of an external force that would include the force applied by a human hand of a user manipulating the pair of rails 130 will overcome the resistive force of the frictional engagement between the channels 180 and the outer surface of the pair of rails 130 such that the pair of rails 130 may be positioned in a distinct translational location relative to the rails-clip coupling mechanism 170. As is apparent from the figures, in the arrangement of FIGS. 1A-1C, a portion of the pair of rails 130 is continuously housed within the rails-clip coupling mechanism 170, within the channel 180 in particular. When the illuminating device is repositioned such that the pair of rails 130 is slid through the channels 180 and then stopped when the next desired position is selected, a different region of the outer surface of the pair of rails 130 will be housed internally within the rails-clip coupling mechanism 170. The channel 180 and the outer surface of the pair of rails 130 still will be frictionally engaged such that the position of the light can be generally held in place should the position be a desired positioning of the illuminating device. As such, the rotational attributes of the head 110 translationally fixed and pivotably attached to the pair of rails 130, the base 150 being pivotably coupled to rails-clip coupling mechanism 170, and rails-clip coupling mechanism being configured to slidably house the pair of rails 130, enables the illuminating device to have complex movement/orientation attributes to facilitate use of the lighting characteristics in any of a number of environmental situations. These motion characteristics will be described further below.

Figure 2A:
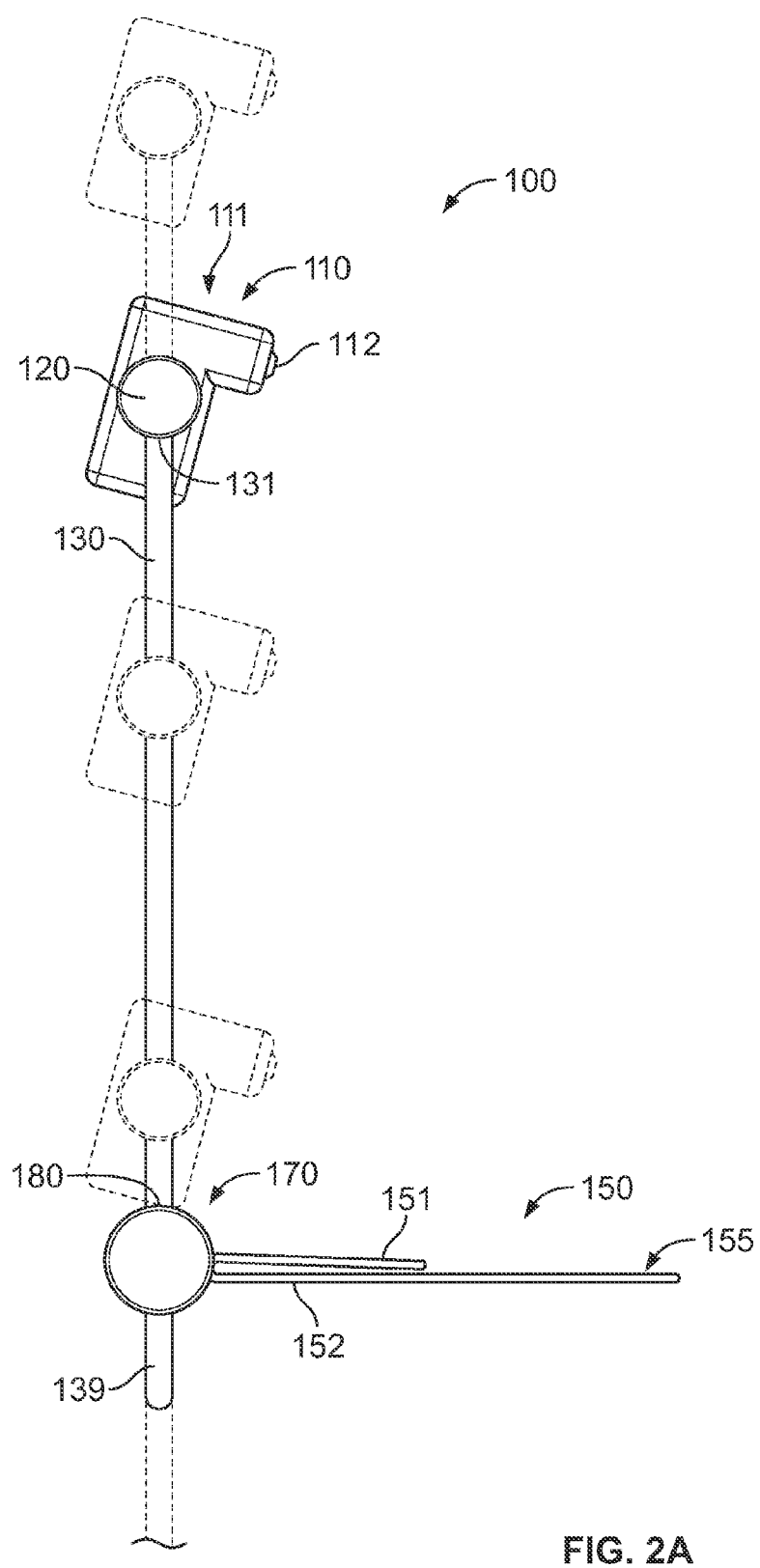
FIGS. 2A and 2B are side and perspective views respectively depicting varied positions of the illuminating device of FIGS. 1A-1C.
Figure 2B:
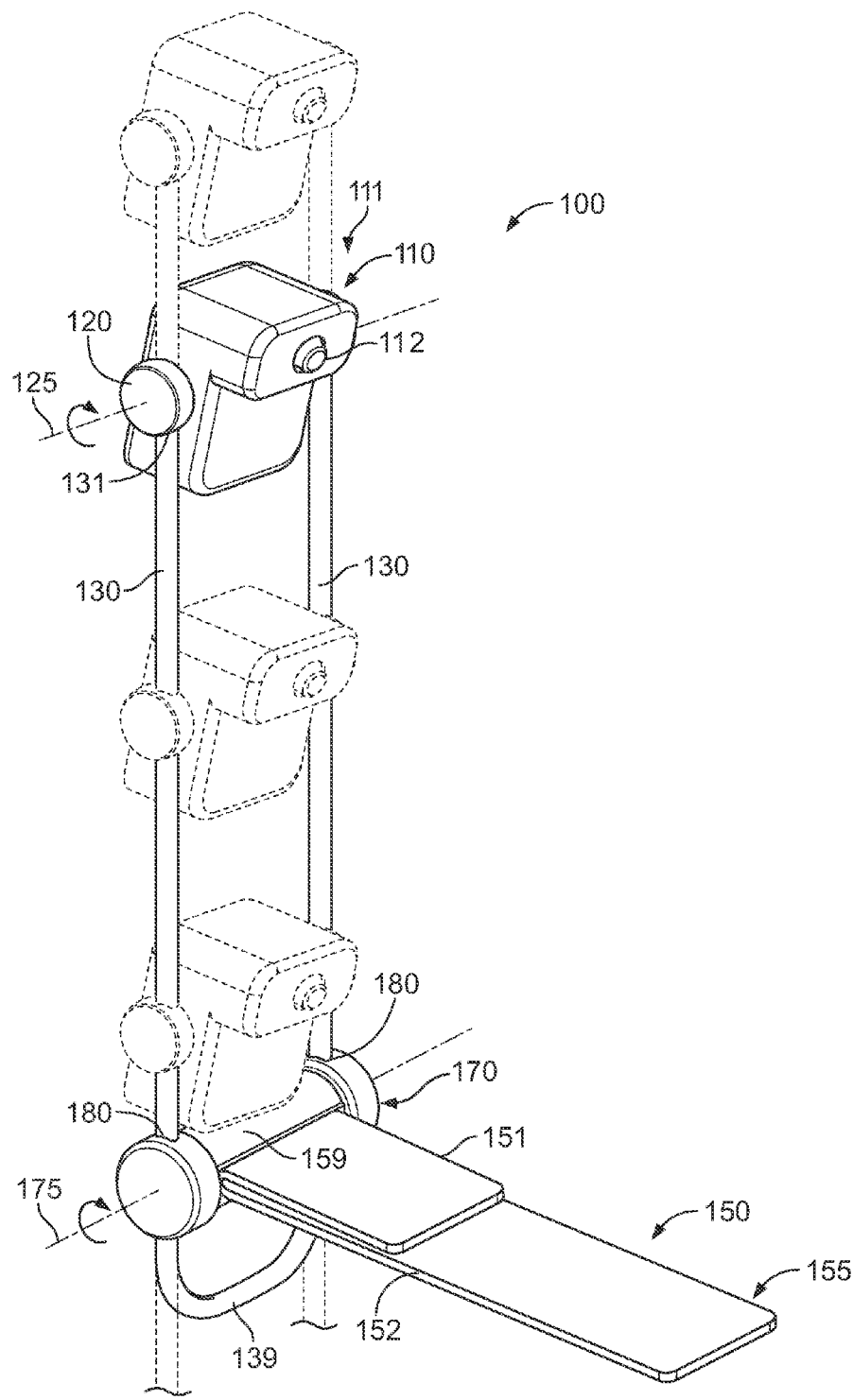

FIGS. 2A-2B are illustrative side and perspective views of the illuminating device demonstrating varied movement characteristics. In particular, FIGS. 2A-2B illustratively demonstrate varied positioning of the head 110 relative to the base 150. Here, the illuminating device 100 is illustratively shown in four varied positions. The position shown is demonstratively shown in broken line in which the position of the head 110 shown the furthest distance from the base 150 may be referred to for ease of understanding as the extended position. In contrast, the position in which the head 110 is closest to the base 150 may be referred to as the retracted position. In the arrangement of FIGS. 2A-2B the head 110 of the illuminating device 100 is illustratively shown as contacting or engaging a portion of the base 150 when the head 110 is placed in the retracted position. However, in other arrangements, the head 110 may not contact a portion of the base 150 when the head 110 is placed in the retracted position. Lastly, two other varied positions between the extended position and the retracted position are further illustratively shown in the FIGS. 2A-2B, one in solid line and the other in broken lines. As is apparent in FIGS. 2A-2B, the pair of rails 130 may be slid relative to the base 150 (including the clip 155) and/or rails-clip coupling mechanism 170 so that the illuminating device is positioned in a variety of positions. Additionally, in the arrangement shown in FIGS. 2A-2B, the slidable coupling of the pair of rails 130 to the rails-clip coupling mechanism 170 holds the illuminating device 100 in position when user withdraws or stops applying a force to move the pair of rails 130 relative to the rails-clip coupling mechanism 170 until the a further force is applied to the illuminating device 100. As such, the illuminating device may be manipulated in varied positions such as those depicted in FIGS. 2A-2B and the device will retain those positions. Then, when a further position of the device is desired, the user may further manipulate the illuminating device 100 from that position to a further desired position by again applying a force.

Figure 3A:
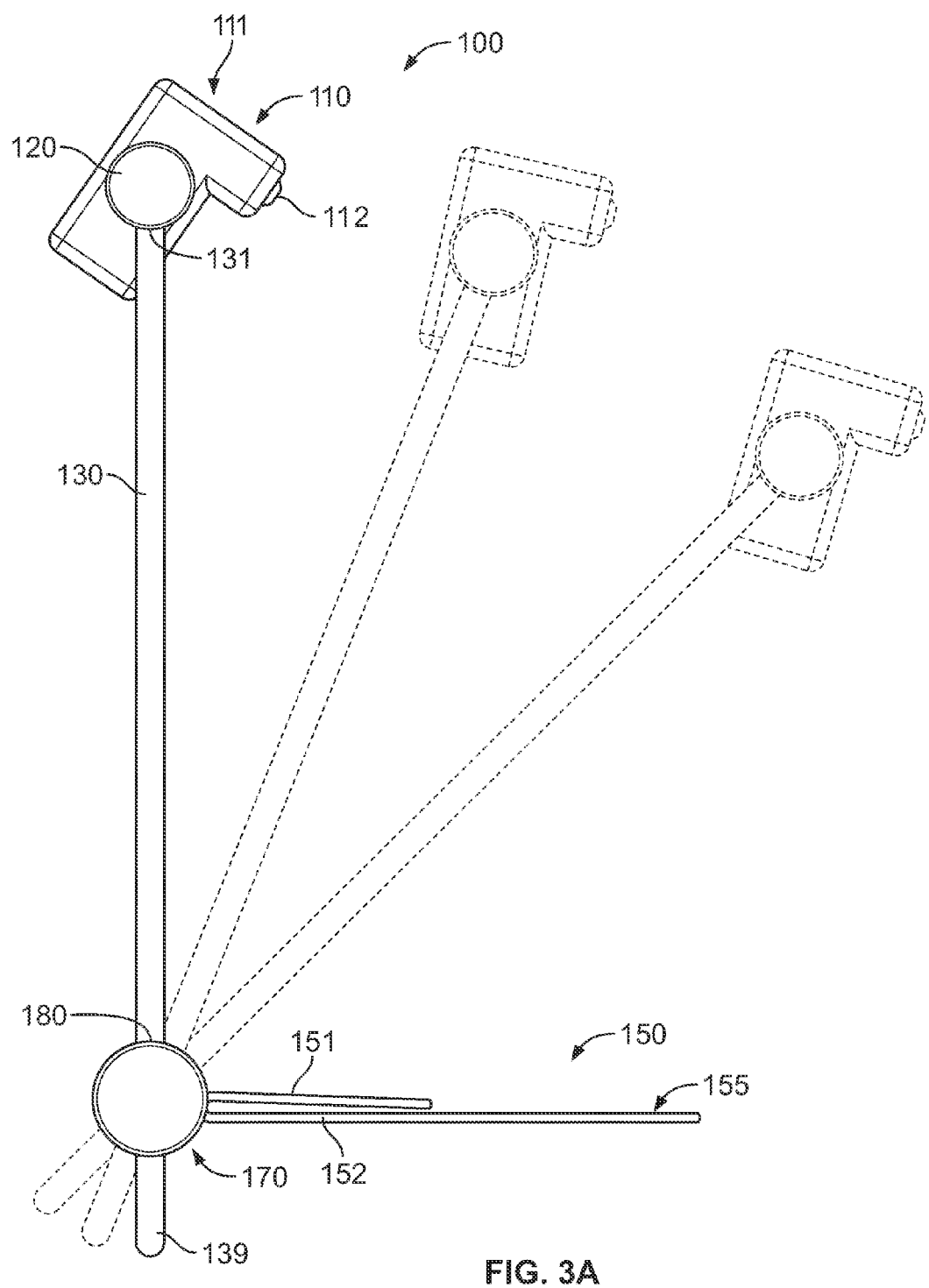
FIGS. 3A and 3B are side and perspective views respectively depicting varied positions of the illuminating device of FIGS. 1A-2B.
Figure 3B:
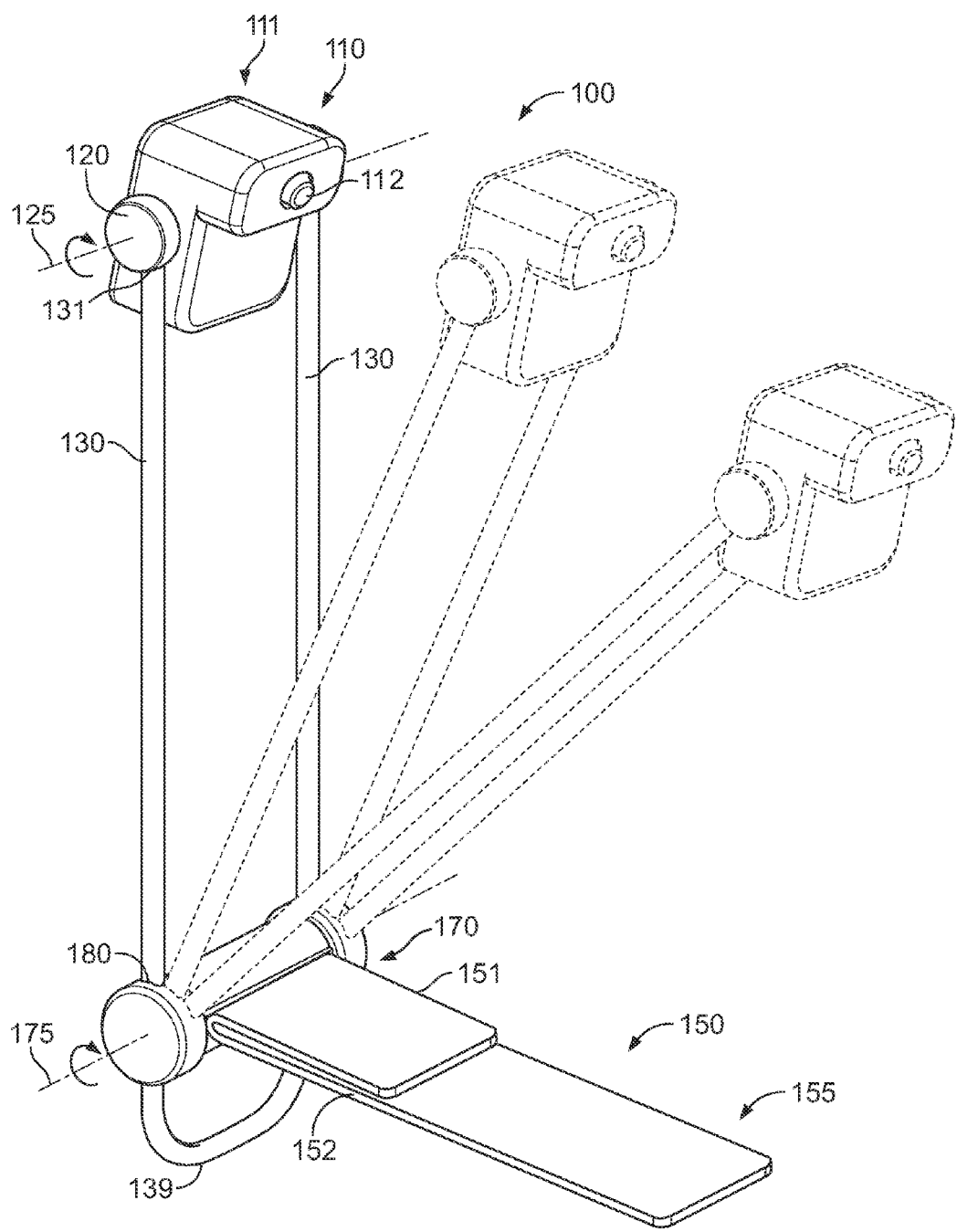

FIGS. 3A-3B illustratively depict further movement and positionability traits of the illuminating device 100. FIGS. 3A-3B further demonstrates the pivotability of the head 110 relative to other features of the illuminating device. In certain configurations, head 110 may be pivoted 360 degrees about the axis of rotation 125. FIGS. 3A-3B demonstrates that the head 110 may pivot and may be continued to be rotated around the pivots 120. This movement can be continued until a full revolution is made. Additionally, as is apparent from these figures, the head 110 may also be rotated in both directions in what may be characterized as forward and backward rotation. Complete 360 degree rotation about the axis 125 in opposing directions in certain configurations enables users to further manipulate the illuminating device 100 in quick and easy fashion such that they may quickly adjust the illuminating device 100 by minimizing movement of the device to reach a given position. Users tend become uncomfortable when remaining in any posture for too long. As such, while reading or performing other sedentary tasks, a user may readjust his or her position to provide further comfort. The illuminating device 100 as shown FIG. 3A-3B allows the user to bring the light source 112 closer to a user's eyes, reading material, or body then move it further away and any variety of success variations in its position. Coincidentally, the orientation of the light source 112 may also be varied as the light source 112 is housed on the head 110 and the head 110 pivoted relative to the pivots. The head 110 (and the device in general) will retain the last position the user places it in. Accordingly, users may continually vary the source, direction, and proximity as their illuminating needs change or vary and to further allow them to retain varied comfortable postures while utilizing the illuminating device 100.

Figure 4B:
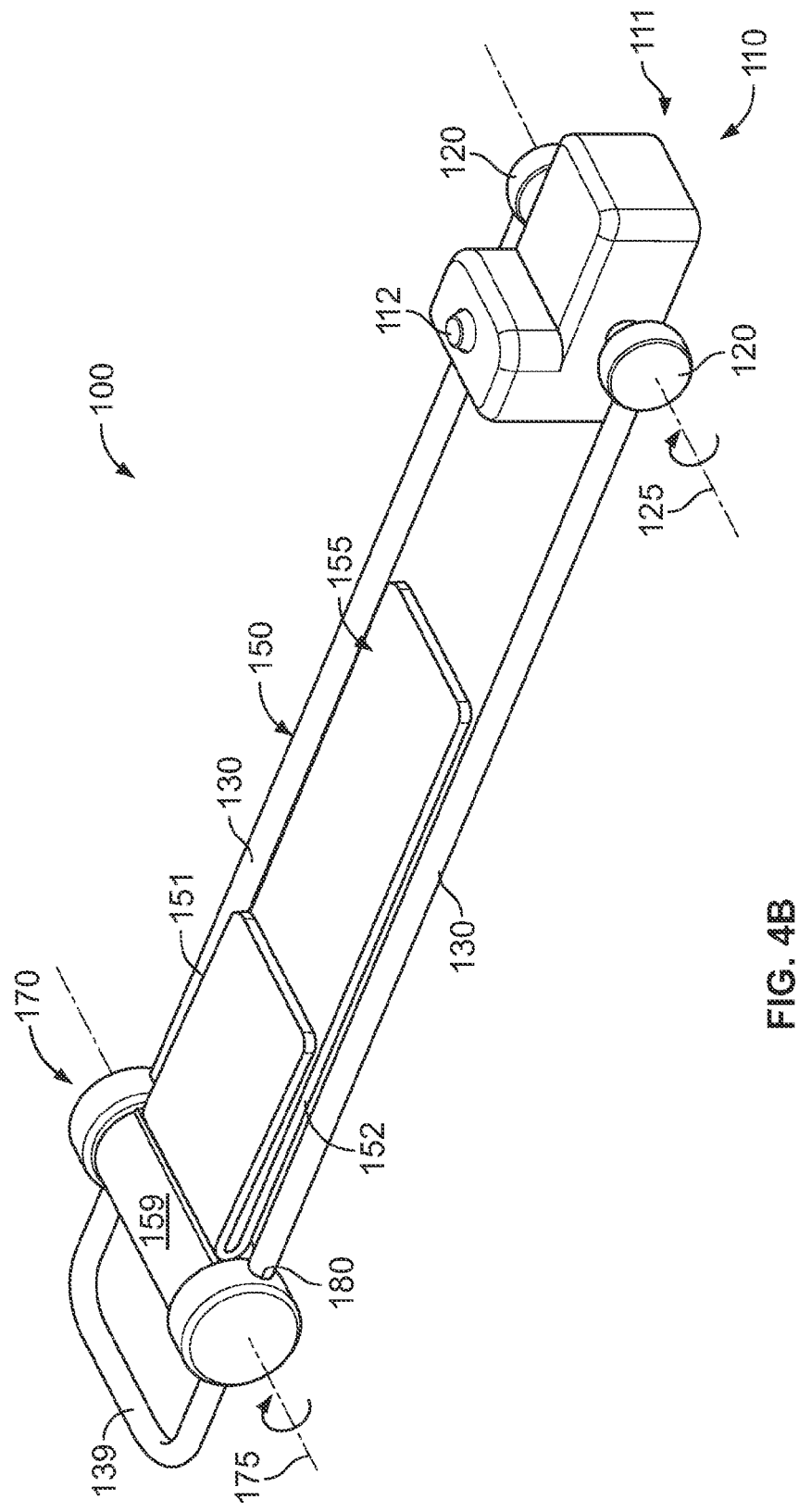

FIGS. 4A and 4B are perspective views respectively depicting varied positions of the illuminating device of FIGS. 1A-3B. The illuminating device 100 in FIGS. 4A and 4B is shown in what may be referred to as a closed position. As is apparent the base 150 including clip 155 is housed completely within a region between the pair of rails 130 including sleeve 159 which is a portion of the base and assists in coupling the remainder of the base to the rails-clip coupling mechanism 170 and pair of rails 130. In this position the illuminating device 100 has its slimmest profile. It sits generally flat with only portions of the device protruding upward and or downward at the rails-clip coupling mechanism 170 and the head 120 which may be thicker than the clip 155 and pair of rail regions of the device. The illuminating device 100 may be placed in the closed position for a number of reasons including transportation or storage. Additionally, as is apparent from the varied position of the head 110 shown between the views of FIGS. 4A and 4B, the head 100 continues to be pivotable while the illuminating device 100 is in the closed position. In particular, FIG. 4A demonstrates the illuminating device 100 with its head 110 facing downward while FIG. 4B demonstrates the illuminating device with its head 100 facing upward. Additionally, the light source 112 can continue to be utilized to provide light as desired while in the closed position including shining of light in varying directions as the head can continue to be manipulated to provide light in varied directions. Accordingly, the illuminating device 100 may be utilized to provide light in constrained or limited space including small rooms, vehicles including cars, planes, trains and buses and desks. Also the illuminating device 100 may be utilized to provide lighting to one user without disturbing other nearby people that may be sleeping or viewing PDAs or other devices, etc. In the closed position, the illuminating device 100 may also be utilized as a book mark and placed between pages.

In certain configurations the device is shaped and sized such that in the closed position the central the region of the device as shown in FIG. 4A-4B may be placed between pages of a book, magazine or similar structure and the head 110 and rails-clip coupling mechanism 170 regions may be housed outside the book or magazine permitting the illuminating device to be stored within the book or magazine and further permitting easy transportation and storage of the illuminating device. The extension and retraction features of the pair of rails 130 further facilitates this functionality as an illuminating device 100 can be stored in a variety of different size books, periodicals and similar structures as the device can be varied to a variety of lengths in the closed position as demonstrated in FIGS. 2A-2B. Additionally, the extension features of the pair of rails 130 from the closed position also allows illumination off flat surfaces such as a table or desk wherein the flat surface would provide support for the base 150 and portions of the pair of rails 130 while the head 110 and the adjacent portions of the pair of rails 130 may extend in cantilever fashion over the edge so as to provide light to a surface below. Alternatively, the illuminating device 100 may also be hung by placing a feature supporting the device through the opening defined by the base end 139 of the pair of rails and the rails-clip coupling mechanism 170. As such the illuminating device 100 may be hung on a hook, finger-type member or other protrusion and the device operated while in a suspended position. Other uses and similar configurations are possible and contemplated.

The above described movement traits described and contemplated permit significant user variation in his/her positioning of the head 110. This variation accommodates varied environmental use and varied ergonomic preferences. In an extremely dark environment in which a person does not wish to disturb a neighbor such as when a user may be reading in bed while their spouse or roommate sleeps, it may be desirable to place the head 110 in a retracted position so that it brightly illuminates the portion of the page that is being read however it provides less incidental illumination of neighboring areas. Alternatively, the illuminating device 100 may be used in a somewhat lit area to supplement the lighting already present such as in a plane in which over head lighting is provide and the head 110 may be placed in an extended position to provide a wider footprint of light such that a large magazine or even tour map for example can be fully lit. Numerous variations exist and various intermediate positions can also be used to accomplish these positions and allow accommodation of books and periodicals of different sizes as well as placement of the illuminating device at different locations in these books and periodicals and other reading materials. The illuminating device described, because of its functional attributes can facilitate reading page 1 of short story, page 430 of a novel, reading the bottom of a page or the top of the page, and the extremely varied permutations in between. Specifically, the illuminating device 100 is compatible with reading materials of varied size, shape and length. It is also compatible with varied rigidity such as soft and hard covers.

Additionally, it should be recognized from the above figures especially including FIGS. 4A-4B that the illuminating device may continue to be utilized even when the user is not reading. In at least the closed position, the described illuminating device may serve as a bookmark. With its slim profile the illuminating device 100 may be placed or left within the pages of the book, magazine or other reading material to save the place as bookmarks in the manner in which bookmarks are known to be used. Further, the features of the illuminating device allow improved use as a bookmark. For example, the page a reader is on may be placed in clip 155 such that illuminating device will hold the place in a preferred manner to a simple traditional bookmark which is prone to fall out of the book during travel or other movement. Additionally, the illuminating device may be oriented such that the head extends beyond the pages of the book and the light may be utilized in other situations in which illumination is needed without removing the illuminating device from the book. Additionally, since the light source 112 and power switch 113 is housed on the head 100 in certain configurations, the device may be operated when the entire device but for the head is covered or "sandwiched" in a book or other structure.

FIGS. 5A-C demonstrate several illustrative configurations of heads 110 that may be used in an arrangement of the illuminating device 100 as described above. FIG. 5A depicts an enlarged round head in housing user engageable control mechanism 113 and a light source 112. In FIGS. 5A-5C the user engageable control mechanism 113 may be characterized as an "ON" and "OFF" switch. In the arrangement of FIG. 5B the head 110 has a rectangular shape, the user engageable control mechanism 113 may be described as a slide bar, and the light source 112 is housed on the front side of the head 110 while the user engageable control mechanism 113 is housed on the top surface. Lastly, FIG. 5C demonstrates an ovular shaped head 110 with a user engageable mechanism 113 in the form of a depressible button substantially similar to the button shown in FIGS. 1A-4B. Further head, light sources and user control mechanisms are well known in the art and are contemplated with respect to the described illuminating device. Accordingly, desired functionality, sizing, movement, spacing and appearance may be accomplished varying the particulars of the head. For example, each of the embodiments of FIGS. 5A-5C include light sources of varied shape and contour. Additionally, a plurality of light sources 112 (as shown in FIG. 5C) may be used on the head of the illuminating device provide additional lighting or preferred light characteristics.

Additionally, as demonstrated, in lieu of the previously depicted depressible button shown in FIGS. 1A-4B, user engageable control mechanism 113, may be any of a number of conventionally used switching mechanisms including switches, slide bars, toggles, and linearly slideable elements to allow the user to control light source housing 111. For example, a user may interact with user engageable control mechanism 113 to adjust the brightness, permit intermittent light to be emitted, and turn the light source housing 111 "ON" and "OFF". As described, any user engageable control mechanisms/switches well known in the art may be utilized to change the illuminating device between "ON" and "OFF" states. In another exemplary embodiment not depicted, a rotatable control mechanism such as a dial may be utilized. To turn the light between the "ON" and "OFF" states or to vary the brightness when in the "ON" states thereby controlling the illuminating device. In yet another embodiment, a slide bar mechanism may be used to control the illuminating device. The bar is slid along a track and based up on the location of the slide bar, the light is either entirely "ON", "OFF," or has a varied brightness in between a complete "ON" or "OFF" position. These described mechanisms and further similar mechanisms are well known in the art.

Head 110 may be coupled to the pair of rails 130 by any of a number of structural configurations so as to enable and permit the motion traits as described herein. For example, the head 110 may be coupled to the pair of rails 130 in a similar fashion as the clip 155 or base 150 is described herein as being coupled to the pair of rails 130. Additionally, the head 110 may house a hole or depression 115 on opposing sides of the head for insertion of a pin into the head 100 as is illustrated in FIGS. 5A-5C. Accordingly, these pins located on opposing sides rotatably housed in holes 115 thereby couple the head to the pair of rails holding the head 100 in a translationally fixed location while permitting rotational motion about the pins as is understood from FIGS. 5A-5C and other figures shown herein. Numerous other particular mechanical coupling mechanism are contemplated and may be used consistent with that described.

In many of the illustrated exemplary embodiment, the user engageable control mechanism 113 (e.g., depressible button) is located at the top of the upper section 112 of the housing 115. However, in alternative embodiments the user engageable control mechanism 113 may be located in different positions on the surface of light source housing 111 such as on the side of the housing 111.

As previously described, the head 110 typically includes various electrical components and features. Such exemplary components include power sources such as batteries, connecting circuitry conventionally used in light sources, especially portable light sources, an illuminating member, and any other components commonly used in portable lighting devices. Housing all of the components used in illumination in or on light source housing 111 provides for more freedom of design. Additionally, the pair of rails 130 are free to slide relative to the rails-clip coupling mechanism 170 and the base 150. However, as previously described, in an alternative embodiments the power source could be located outside the head 110 and instead in either the rails-clip coupling mechanism or the clip 155. In such, configurations power could be run through the pair of rails. However in these configurations the pair of rails may need to be constrained or have limited or no translational movement capabilities relative to the rails-clip coupling mechanism 170 and base 150 as an electrical contact for electricity to flow from the power source to the pair of rails 130 and up to the head 110 is required. Wiring could be run through the pair of rails 130 however a contact bridging the span between the power source and the pair of rails 130 would be utilized. In order to allow the motion characteristics as described and shown herein, a groove could be placed in the pair of rails such that a complimentary pair of track and follower members were utilized. In particular, the track would be located in the pair of rails and the follower member would be housed in channel 180 and as the pair of rails was slid with respect to the channel 180 the follower member would remain in contact with the track which would made of electrically conductive material so as to continue the electrical connection.

Figure 6B:
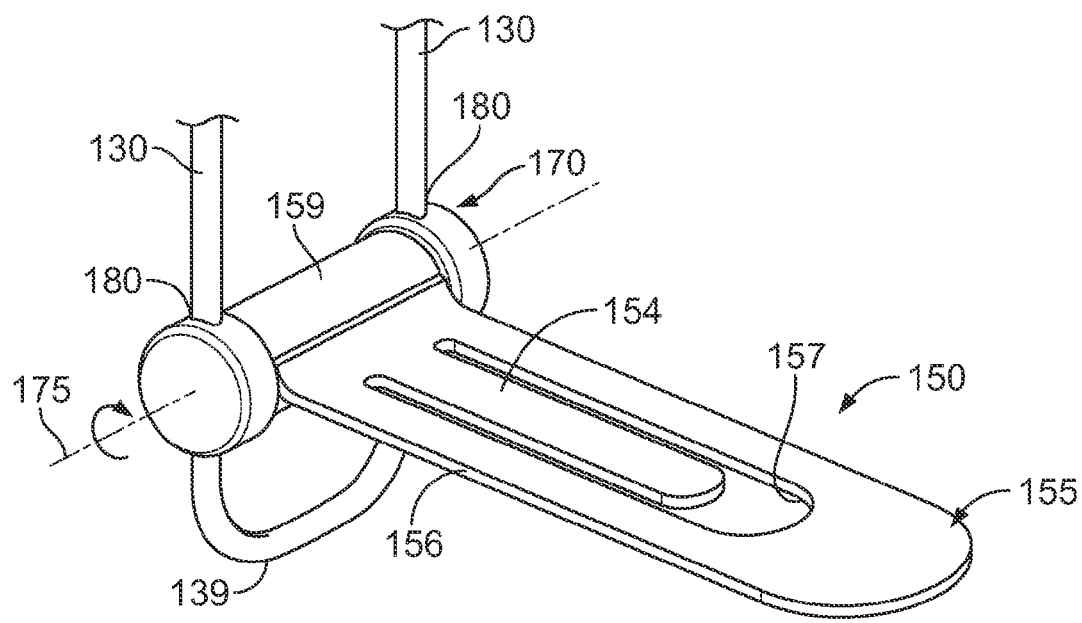
Figure 6C:
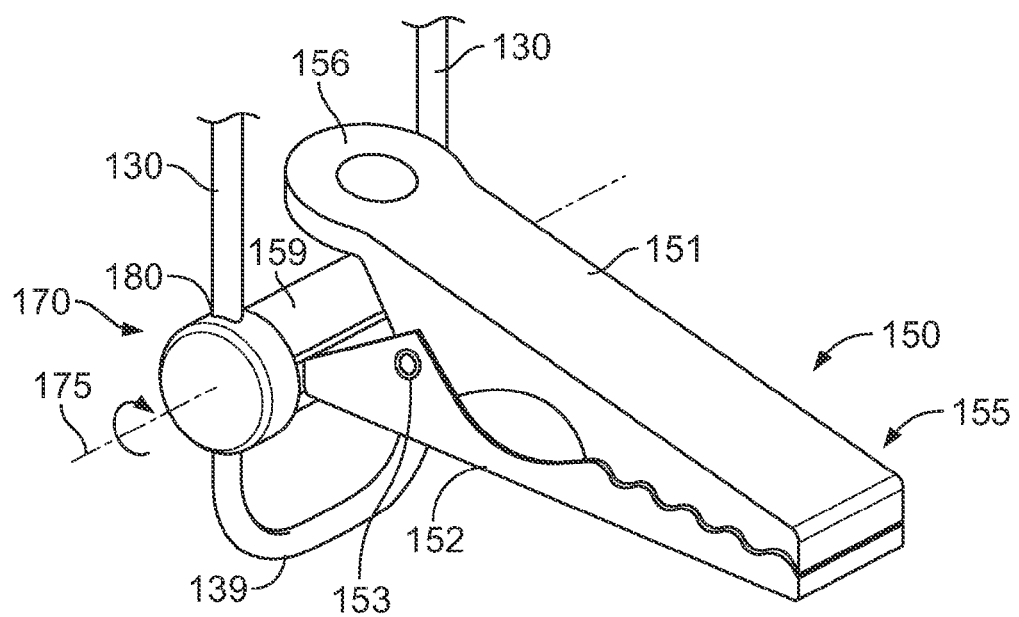

Just as the head 110 of the illuminating device may possess varied characteristics, the base may also be shaped, sized and configured so as to accomplish desired functionality. FIGS. 6A-6C depict illustrative arrangements of bases 150. In the base 150 depicted in FIG. 6A is akin to the base 150 depicted above however here the top 151 and bottom 152 members are comparatively closer to equivalent in size and length. Additionally, here the end of top 151 clip member has a rounded end while the bottom 152 clip member has a rectangular end. In contemplated configurations, the top and bottom FIG. 5A also demonstrates that the base may be made of a transparent or a translucent material so as to permit a reader to view various indicia on an opposing side of the clip 155. As such, a user may be able to read text through the clip 155. FIGS. 6B and 6C demonstrate further configurations of base 150. In FIG. 6B, the base is configured in what may be described as more of a paper-clip style form. Here, instead of top and bottom members of the clip, the clip is arranged such that inner 154 and outer 156 members of the clip 155 are utilized to grasp, attach or otherwise secure the base 150 to a structure. The clip 155 of FIG. 6B is designed for securing the illuminating device 100 to thinner structures such as paper or other sheet-like material as the material may be slid in the empty cavity region between the inner 154 and outer 156 members. In this configuration the structure to which the illuminating device 100 is being secured to may be housed such that the inner member 154 sits on top of the structure and the outer member 156 sits below the structure or vice versa as the inner 154 and outer 156 members possess flexible characteristics such that they are biased to allow structures to be placed between the members. FIG. 6C demonstrates a further configuration of a base 150 consistent with that described herein. Here, the base 150 may have a general functionality of an alligator clip or the like. Top 151 and bottom 152 are biased by a biasing feature such as a spring or like structure (not shown but housed internal of the clip) and may be opened and closed by pressing on grip 156. When pressure is applied downward on grip 156 and/or the clip 155 is squeezed at that location, the opposing ends of the clip 155 are opened as the members about pivot 153. As such, the clip of FIG. 6C may be opened and then when the user removes the force, the opposing biasing force causes the clip 155 to close. While FIGS. 6A-6C demonstrated numerous base variations and arrangements, further configurations are contemplated consistent with that described herein.

FIGS. 7A-7C demonstrate further varied configuration of the base end 139 of the pair of rails 130 with the clip 155 cut-away or "removed" to further, and more clearly, demonstrate various illustrative arrangements of the rails. Generally speaking the pair of rail 130 may form a closed end such as that shown in FIGS. 7B & 7C or an open end such as that in FIG. 7A. In FIG. 7A the base end 139 of the pair of rails is open and includes a stop 133. Two configurations of closed base ends 139 are depicted in FIGS. 7B and 7C. Each has a plurality of elbows 134 in which the pair of rails 130 is bent or contoured to form the closed end as described. Further varied shapes and configurations may be formed by varying the number and location of elbows while retaining the pair of rail configuration.

In most configurations, the base end 139 serves to hold the rails-clip coupling mechanism 170 on the pair of rails 130 when a user manipulates the device into the extended position. But for the base end 139, the rails-clip coupling mechanism 170 or other members of the illuminating device 100 could slide off the end of the pair of rails 130. Additionally, the base end 130 also may serve as a further securing or grasping and/or a balance feature when the illuminating device is in certain positions. For example, when the illuminating device is in a retracted position such as that of FIG. 2B such that the base end 139 is in a fully extended posture and fully extended from the rails-clip coupling mechanism 170, the pair of rails 130 may serve as a "back support" for keeping the light in place when the light is placed on the edge of a flat surface such as a desk or table. For example, if a book was placed on a desk with a back panel and the illumination device 100 was clipped to the pages of the book by its base 150, the pair of rails 130 could be extended downward along the rear of the desk providing further stability of position of the illuminating device. This configuration also allows the light source to sit close to the book and pages.

Figure 8A:
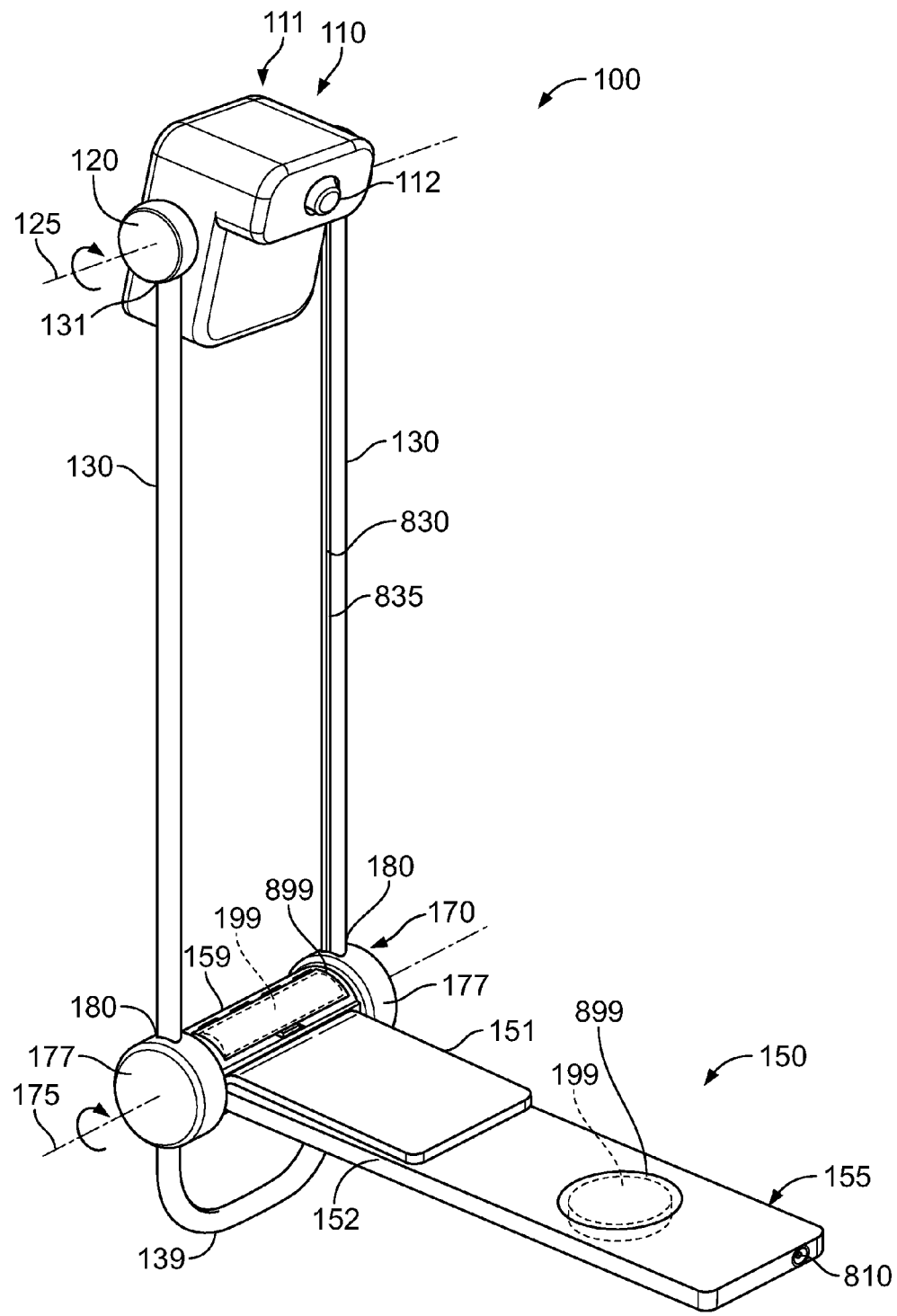
FIGS. 8A-8B are illustrative schematic perspective and top cut-away views of an alternative arrangement of the illuminating device.
Figure 8B:
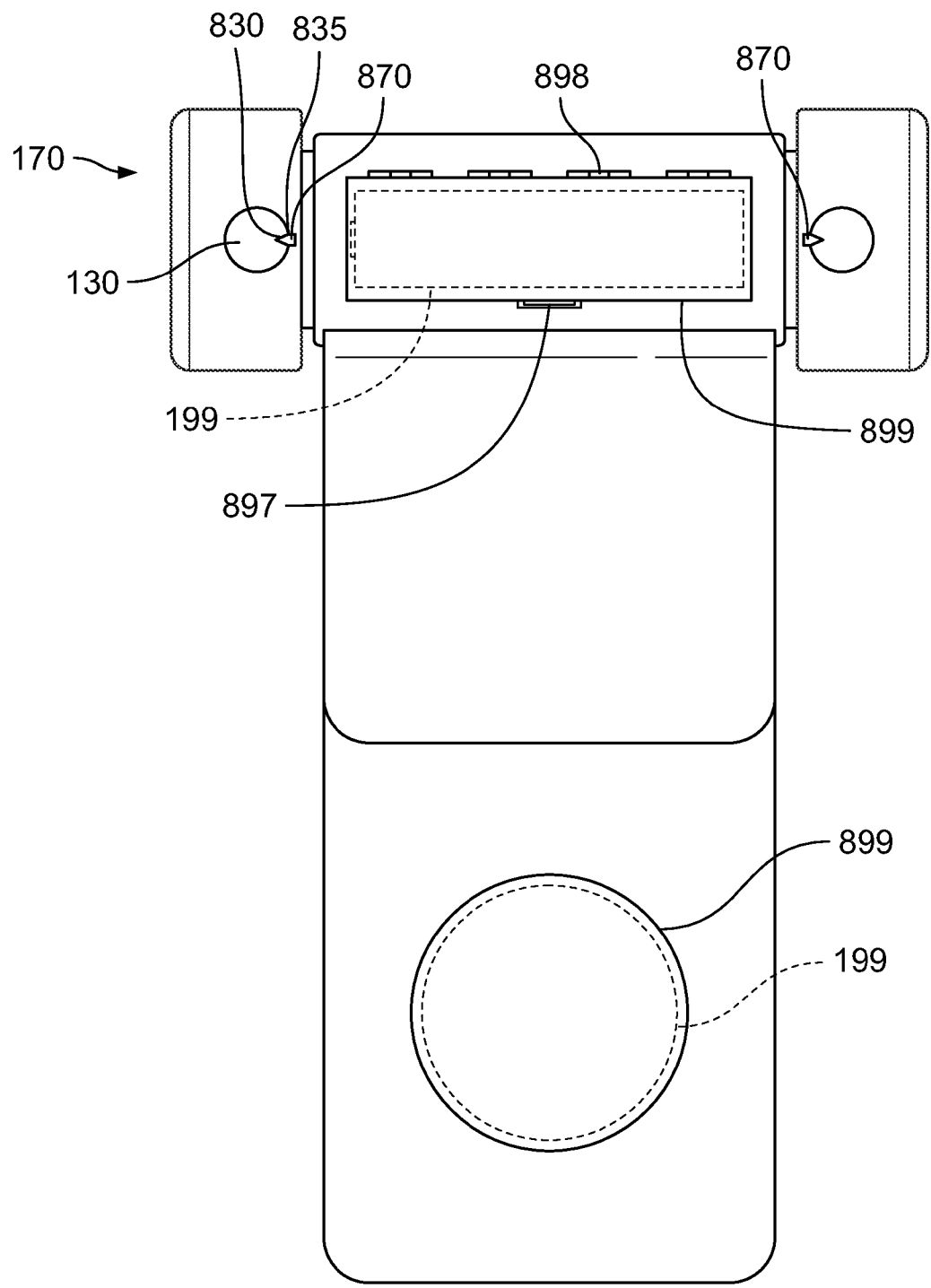

FIGS. 8A-8B are illustrative perspective and cut-away schematic views of another arrangement of an illuminating device 100. In particular, the illuminating device 100 of FIGS. 8A-8B is similar to the arrangement of previous illuminating devices 100 shown, however, this arrangement has a varied configuration relating to the power source and powering of the light source 112. While an illuminating device configuration in which a power source 199 is housed at the head 110 was previously described (e.g. FIGS. 1A-1C), various other configurations are contemplated consistent with that described herein.

As show in FIGS. 8A-8B, a power source such as a battery 199 may also be positioned at other locations of the illuminating device 100. (FIG. 8B is a top view with the head 110 removed.) For example, a battery 199 may be housed on the clip 155 or on the rails-clip coupling mechanism 170. A battery 199 may be housed in either the top 151 or bottom 152 of the clip 155. The battery 199 may also be housed under a cover 899 which may be secured to the clip 155 via a number of fastening mechanism such as screws or latches or various other securing mechanisms. It may be desirable for the cover 899 to sit flush with the remainder of the top 151 or bottom 152 of the clip such that the cover does not interfere with the attachment of the clip 155 to structures to which it engages.

As shown in FIGS. 8A-8B, a power source may also be housed in the rails-clip coupling mechanism 170 as shown. Again a cover 899 may assist in housing the battery 199. In the configuration shown, the cover 899 may be shaped with a complimentary cylindrical curve so as to sit flush with the remainder of the sleeve 159. The cover 899 may include securing and movement mechanisms such a hinge(s) 898 and a latch(es) 897 so as to allow the cover to be opened and secured as is known by those skilled in the art. In this configuration, since the sleeve 159 circumscribes the portion of the rails-clip coupling mechanism 170 that houses the battery 199, the sleeve 159 may need to be rotated so that the cover 899 aligns with the portion housing the battery 199 so as to allow removal or replacement of a battery 199. Alternatively, a cage like structure under the sleeve 159 may be configured to house the battery 199 but also to allow the battery 199 to be removed when the sleeve 159 and the cover 899 are in varied positions. For example, while not depicted, the several structural members of a cage-like structure may be housed within the sleeve 159 while the region between these members may still be left open such that a battery 199 could fit between them. As such, the requisite frame structure is provided while providing sufficient space and access for placement and removal of a battery 199.

As described, common cylindrical batteries such as AAA and AA batteries or various other shaped batteries such as disc shaped batteries may be utilized. As recognized by those skilled in the art, it may be advisable to use a flat or disk shaped battery when placing the battery in flat clip sections. However, in an arrangement in which the battery is placed in a rails-clip coupling mechanism as depicted in FIGS. 8A-8B, common cylindrical batteries may also be utilized.

Rechargeable batteries may also be used and may be desirable since the illuminating device may often be used as a portable illuminator. Using an input such as power port 810, the illuminating device 100 may be plugged into a wall outlet or other electronic devices so as to permit electricity to be transferred to the illuminating device 100. Similar to how a cell phone, PDA or laptop may be recharged, so too can the illuminating device be recharged at a user's convenience. As such, the batteries 199 as shown may be rechargeable. The rechargeable batteries may be non-removeably or removeably placed in the locations shown as well as various other locations on the illuminating device.

In configurations in which the power source is housed away from the head, a mechanism for transporting electricity from the power source to the light source 112 may be utilized. As shown in FIGS. 8A-8B, an illustrative means of transferring electricity from batteries 199 housed either in the rails-clip coupling mechanism 170 or the clip 155 is depicted. Here, rails 130 are configured to include a groove or channel 830 that is shaped complimentary to a protrusion 870, such that the protrusion 870 may form a slidable conductive connection while still allowing the movement and positioning traits of the illuminating device 100. The groove 830 may include a coating or insert 835 of conductive material, such as a metal, and the protrusion may be formed of a conductive material such as a metal as well. As such, wires or circuitry can be run through the base 150 connecting the battery 199 to the protrusion 870. Wires or circuitry may be housed internally within one or both rails of the pair of rails 130 or externally on one or both of the rails of the pair of rails 130. Accordingly when the power source is housed in the base 150 power can accordingly be provided to the head 110 including the light source 112. In one illustrative arrangement, groove 830 may run the length of the rails 130 such that regardless of where the rails-clip coupling mechanism 170 is positioned, a conductive connection is maintained so that the light source 112 is continuously powered when the power switch is on the "on" position. By housing the insert 835 on a groove 830 in the rails, a user safe mechanism for powering the illuminating device through the rails is accomplished. As shown here, the insert 835 and groove 830 are housed on internal edges of each of the rails. However, the light source 112 may be powered with only an insert 825 and groove 830 and associated protrusion 870 on only one of the rails 130. Also, the location of the groove 830 and insert 835 may be varied depending on the desired configuration.

As described, illuminating device 100 may be utilized, among other things, as a book light. In such use, illuminating device 100 may be decorated and designed with numerous aesthetic features, including decorative shapes, contours, shadings, colors or designs. These decorative features may be placed on, or formed as part of, light source housing 111, base 150 and/or pair of rails 130 to name a few components. The decorative features may encompass a seemingly limitless list of decoration, and thus are not described in specifics herein. As previously described, components of illuminating device 100 may have varied characteristics depending on the desired functionality and appearance. For example, each of light source housing 111, base 150, and pair of rails 130 may have varied physical, material, and functional aspects. Similarly, the orientation or manner of connection of head 110, pair of rails 130 and base 150 may be varied.

Additionally, the illuminating device 100 may possess any combination of a number of functionalities. Generally, the aforementioned exemplary illuminating device 100 possesses improved utility and movement as compared to conventional lights. The illuminating device 100 enables numerous illuminating positions and the illuminating device 100 further possesses variability based upon the user's preferences regarding amount, brightness, color, intensity and direction of lighting provided. The base 150, for example, may be used to affix the illuminating device 100 to countless surface and structures. The illuminating device 100 may also be hung, affixed directly to or placed beside, any area of intended illumination.

Various components of the illuminating device may be composed of varied materials. For example, the head including the housing and the base often may be formed of plastics, polymers and various known metals depending on desired characteristics. Materials may also vary depending on whether the clip is translucent or opaque and functional requirements associated with surrounding materials for the light source and any electrical components including user activation and control features. The pair of rails also may be formed of plastics, polymers, metals and other materials depending on specific desired characteristics. Among the likely desirable feature of the pair rails is certain rigidity consistent with the features and functionality described herein. The light source may include various light-emitting diodes and various other low level illuminators as are known in the art for use as book lights and various other similar task lights. The light sources may also be configured various lenses and covers and other features to accomplish varied light configurations.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. An illuminating device comprising:
a head including a light source housed within the head;
a clip configured to permit removable attachment to an article; and
a pair of rails coupling the head and the clip, the head being both translationally fixed and pivotably coupled to the pair of rails, and the clip being coupled to the pair of rails enabling the clip to be linearly translatable relative to the head along the pair of rails such that, in at least one translated position of the clip, the pair of rails extend beyond the clip in both directions along a line substantially parallel to the pair of rails.

2. The illuminating device of claim 1, wherein the head is pivotable about an axis perpendicular to the pair of rails.

3. The illuminating device of claim 2, wherein the head is pivotable 360 degrees about the axis perpendicular to the pair of rails.

4. The illuminating device of claim 3, wherein the head is pivotable in both directions about the axis perpendicular to the pair of rails.

5. The illuminating device of claim 1, further comprising a rails-clip coupling mechanism coupling the pair of rails to the clip.

6. The illuminating device of claim 5, wherein the rails-clip coupling mechanism is configured to enable the pair of rails and the clip to pivot relative to each other.

7. The illuminating device of claim 6, wherein the rails-clip coupling mechanism slidably houses the pair of rails in channels and is configured such that the position of the head can be translationally moved by sliding the pair of rails within the channels.

8. The illuminating device of claim 7, wherein the channels are complimentary shaped and sized to frictionally engage the pair of rails.

9. The illuminating device of claim 7, wherein a battery is housed in one of the clip and the rails-clip coupling mechanism.

10. The illuminating device of claim 9, further comprising a means for transferring electricity from the battery housed in one of the clip and the rails-coupling mechanism through the pair of rails to a light source housed within the head.

11. The illuminating device of claim 1, wherein the head houses a battery and a user engageable switch configured for controlling powering of the light source.

12. The illuminating device of claim 1, wherein the pair of rails run together and form a continuous rail at a bottom end.

13. The illuminating device of claim 1, wherein the clip comprises a pair of substantially parallel members coupled at a first end and biased relative to one another.

14. The illuminating device of claim 13, wherein the top member of the pair of substantially parallel members is shorter than the bottom member of the pair of substantially parallel members and wherein the first end is coupled to the rails-clip coupling mechanism.

15. The illuminating device of claim 13, wherein the pair of substantially parallel members are translucent.

16. An illuminating device comprising:
a head including a light source housed within the head;
a clip configured to permit removable attachment to an article; and
a pair of rails coupling the head and the clip, wherein the clip is pivotably coupled to the pair of rails such that the pair of rails are moveable between a vertical position in which the pair of rails are substantially perpendicular to the clip and a horizontal position in which the pair of rails are substantially parallel to the clip and extend beyond the clip in both directions along a line substantially parallel to the pair of rails.

17. The illuminating device of claim 16, further comprising a retracted position in which the head is adjacent to the clip and an extended position in which the end of the pair of rails opposite the head is adjacent to the clip.

18. The illuminating device of claim 17, wherein the head and the clip are each pivotably coupled to the pair of rails such that each defines a fixed axis of rotation, these two fixed axis of rotation being parallel.

19. The illuminating device of claim 18, wherein the head is pivotably coupled to the pair of rails by opposing pivots, each of the opposing pivots including a pin protruding into a complimentary recess within the head.

20. The illuminating device of claim 19, wherein the clip is rotatably coupled to the pair of rails by a sleeve wrapped around a coupling member bridging a distance between the pair of rails, the sleeve being configured to frictionally engage the coupling member.

21. An illuminating device comprising:
a head including a light source housed within the head;
a clip configured to permit removable attachment to an article;
a pair of rails coupling the head and the clip, the head being both translationally fixed and pivotably coupled to the pair of rails; and
a rails-clip coupling mechanism coupling the pair of rails to the clip, wherein the rails-clip coupling mechanism is configured to enable the pair of rails and the clip to pivot relative to each other, wherein the rails-clip coupling mechanism slidably houses the pair of rails in channels such that the position of the head can be translationally moved by sliding the pair of rails within the channels, wherein the rails-clip coupling mechanism includes a sleeve coupled to the clip and configured to slidably rotate around a coupling member, wherein the sleeve is wrapped around the outer surface of the coupling member and sits between the pair of rails.

\* \* \* \* \*